(12) United States Patent
Rajashekar et al.

(10) Patent No.: US 9,369,524 B2
(45) Date of Patent: Jun. 14, 2016

(54) SIMPLIFIED AND UNIFIED MANAGEMENT FOR NETWORK-ATTACHED STORAGE

(75) Inventors: Rajesh Rajashekar, Mountain View, CA (US); Steve Klinkner, Fremont, CA (US)

(73) Assignee: NETAPP, INC., Sunnyvale, CA (US)

( * ) Notice: Subject to any disclaimer, the term of this patent is extended or adjusted under 35 U.S.C. 154(b) by 1544 days.

(21) Appl. No.: 12/605,694

(22) Filed: Oct. 26, 2009

(65) Prior Publication Data

US 2014/0082508 A1 Mar. 20, 2014

(51) Int. Cl.
*G06F 15/16* (2006.01)
*H04L 29/08* (2006.01)
*G06F 17/30* (2006.01)
*H04L 29/06* (2006.01)

(52) U.S. Cl.
CPC ...... *H04L 67/1097* (2013.01); *G06F 17/30197* (2013.01); *H04L 69/18* (2013.01)

(58) Field of Classification Search
CPC ................ H04L 67/1097; H04L 69/18; G06F 17/30197
USPC ......................................................... 709/217
See application file for complete search history.

(56) References Cited

U.S. PATENT DOCUMENTS

| | | | | |
|---|---|---|---|---|
| 6,457,130 | B2 * | 9/2002 | Hitz et al. | 726/27 |
| 6,678,828 | B1 * | 1/2004 | Pham et al. | 726/2 |
| 6,931,530 | B2 * | 8/2005 | Pham et al. | 713/165 |
| 7,200,617 | B2 * | 4/2007 | Kibuse | |
| 7,546,432 | B2 * | 6/2009 | Stacey et al. | 711/165 |
| 8,112,465 | B2 * | 2/2012 | Holtom | 707/823 |
| 8,176,012 | B1 * | 5/2012 | Rabii et al. | 707/655 |
| 2004/0015723 | A1 * | 1/2004 | Pham et al. | 713/201 |
| 2004/0093361 | A1 * | 5/2004 | Therrien et al. | 707/204 |
| 2007/0050620 | A1 * | 3/2007 | Pham et al. | 713/165 |
| 2007/0083568 | A1 * | 4/2007 | McGovern et al. | 707/200 |
| 2007/0118687 | A1 * | 5/2007 | McGovern et al. | 711/112 |
| 2008/0086774 | A1 * | 4/2008 | Kanda et al. | 726/24 |
| 2008/0244738 | A1 * | 10/2008 | Shiozawa et al. | 726/21 |
| 2009/0024931 | A1 * | 1/2009 | Bae | 715/748 |
| 2009/0089395 | A1 * | 4/2009 | Fen et al. | 709/216 |
| 2010/0121828 | A1 * | 5/2010 | Wang | 707/694 |
| 2010/0198889 | A1 * | 8/2010 | Byers et al. | 707/827 |

\* cited by examiner

*Primary Examiner* — Douglas Blair
(74) *Attorney, Agent, or Firm* — Klein, O'Neill & Singh, LLP

(57) ABSTRACT

Methods and systems for configuring a network-attached storage (NAS) unit for use with heterogeneous client computers are described. Consistent with some embodiments of the invention, a NAS management module executing on a host computer provides a graphical user interface, and a wizard-like workflow in particular, which enables an administrator to provide configuration settings that make a folder accessible to both CIFS- and NFS-based clients.

20 Claims, 9 Drawing Sheets

FIGURE 4-A
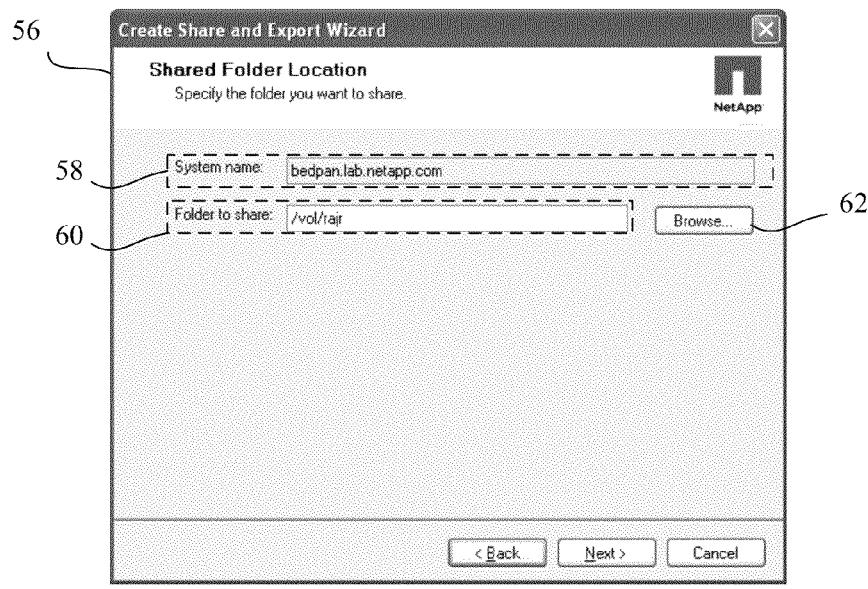
FIGURE 4-B

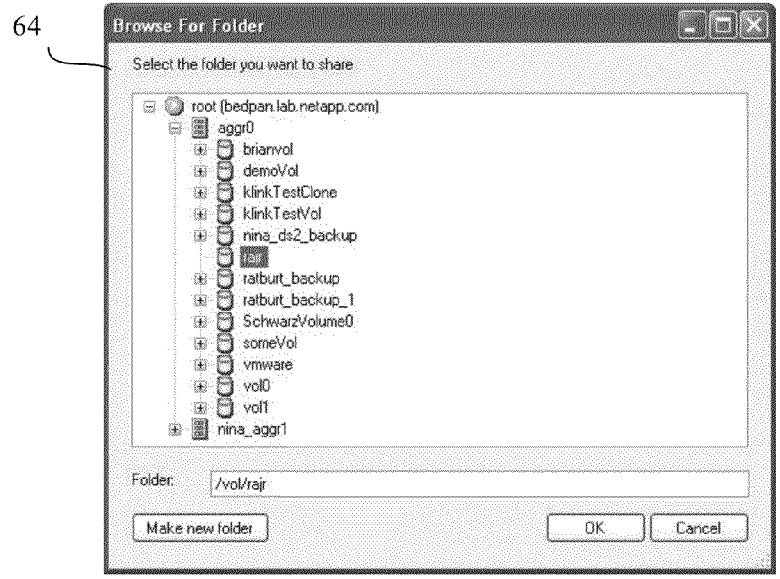
FIGURE 4-C
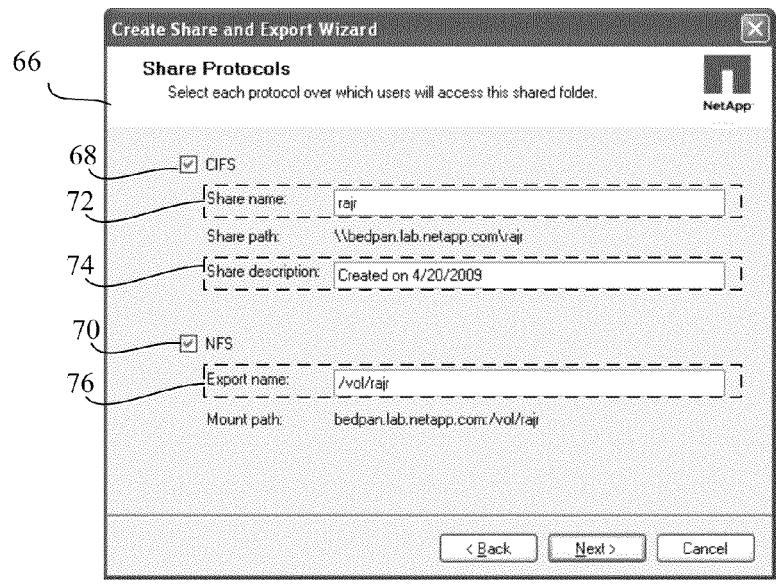
FIGURE 4-D

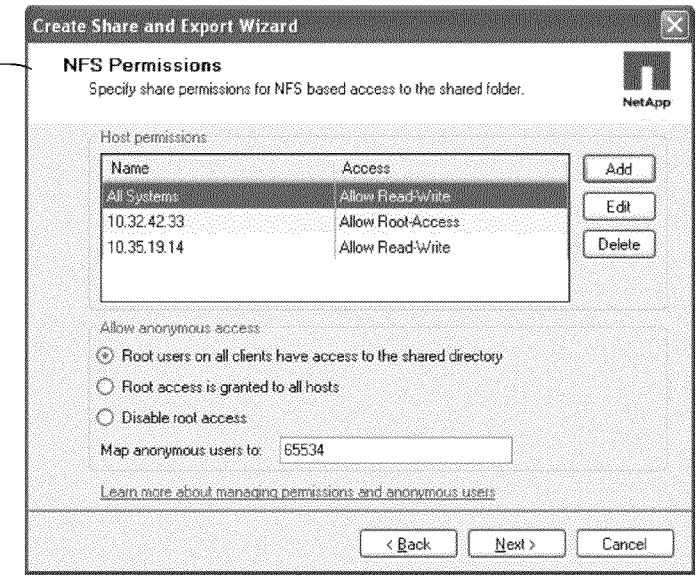
FIGURE 4-E
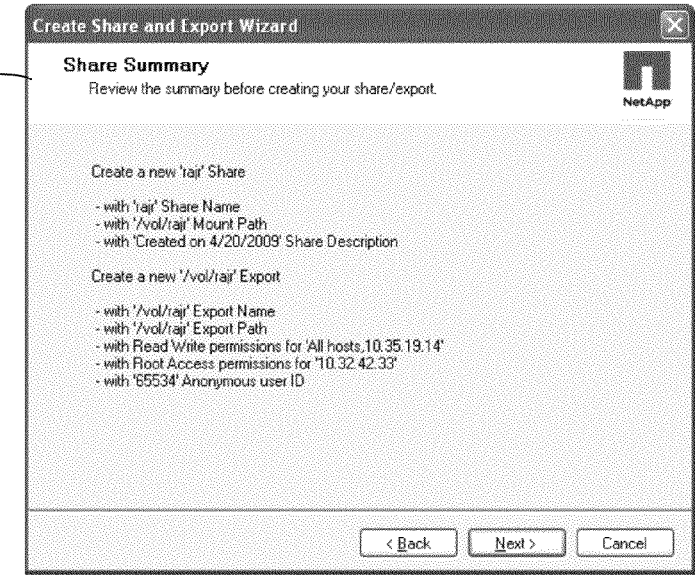
FIGURE 4-F

FIGURE 4-G

SIMPLIFIED AND UNIFIED MANAGEMENT FOR NETWORK-ATTACHED STORAGE

COPYRIGHT

A portion of the disclosure of this document may include material that is subject to copyright protection. The copyright owner has no objection to the facsimile reproduction by anyone, of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document. Copyright© 2009, NetApp. All Rights Reserved.

TECHNICAL FIELD

The present disclosure relates generally to data storage systems, and more specifically, to methods and systems for provisioning storage on a network-attached storage (NAS) unit for use with client computers that utilize different application-layer network protocols.

BACKGROUND

A network-attached storage (NAS) unit is essentially a self-contained computer connected to a network, with the primary purpose of supplying file-based data storage services to other devices (e.g., computers) on the network. The operating system and other software on the NAS unit provide the functionality of data storage, file systems, and access to files, and the management of these functionalities. One of the convenient features of a NAS unit is the ability to make file-based data storage services available via a network to devices (e.g., computers) supporting heterogeneous application-layer network protocols.

For example, a NAS unit can be configured to make a folder (sometimes referred to as a directory) available to Microsoft® Windows-based devices over an application-layer protocol referred to as the Common Internet File System (CIFS) protocol. Although not identical, the CIFS protocol may also be known to those skilled in the art as the Server Message Block protocol, or SMB. A folder made accessible to a CIFS/SMB client (e.g., a Windows-based computer) is often referred to as a network share, a shared folder, or simply a "share". Similarly, a NAS unit can be configured to make a folder available to UNIX-based devices over an application-layer protocol referred to as the Network File System protocol, or NFS protocol. In concept, the mechanism for making storage available to an NFS client is similar to that of a CIFS/SMB client. However, a folder accessible to an NFS client is generally referred to as an "export", instead of a share.

In some business and government entities, computer systems with both operating systems and network protocols—Windows® with CIFS/SMB and UNIX with NFS—are utilized. Consequently, with conventional NAS configuration utilities, an administrator must generate both a share (for CIFS/SMB clients) and an export (for NFS clients) whenever a specific folder is to be made accessible to a group of users using both operating systems and protocols. With conventional NAS configuration utilities, generating both a share and an export will typically require entering multiple commands at a command line interface of the NAS unit, or navigating multiple workflows (one each for the share and the export) of an application with a graphical user interface, providing multiple sets of configuration settings to establish both a share and an export.

SUMMARY

Methods and systems for provisioning storage on a network-attached storage (NAS) unit are described. Consistent with some embodiments of the invention, a NAS management module operating on a host computer provides a single workflow (e.g., a series of dialog boxes and corresponding logic) enabling an administrator to simultaneously configure the NAS unit to make a file system folder accessible to client computers supporting heterogeneous application-layer network protocols. For instance, the single workflow enables the generation of both a share and an export. Accordingly, the share provides a mechanism for making the NAS-based folder accessible to computer clients utilizing the Common Internet File System (CIFS) protocol—commonly utilized on Microsoft® Windows-based computer systems. Furthermore, with minimal additional input and using the same workflow, an administrator is able to simultaneously generate an export, which provides access to the shared folder to client computers utilizing the Network File System (NFS) commonly used on UNIX-based computer systems.

In addition to providing a single workflow for making NAS-based folders accessible to heterogeneous clients, the NAS management module provides a graphical user interface and corresponding logic for browsing, configuring and editing various storage entities (e.g., folders, shares, and exports) and their configuration parameters (e.g., user permissions, host access permissions, and so on) of the NAS unit. In some embodiments, the NAS management module is configured to operate seamlessly with one or more user directory services (e.g., Active Directory Domain Services) that provide information about users and groups within a domain. Accordingly, the user and group information can be presented in a dialog box of a workflow, thereby allowing an administrator to quickly select the users and/or groups who are to have permission to access a particular shared folder (e.g., share or export). In addition to simply selecting the users and groups, an administrator can specify the CIFS-based and/or NFS-based permissions that each user is to have with respect to a particular shared folder. In some embodiments, the NAS management module provides this functionality as part of a workflow for initially establishing a share or export. Additionally, the NAS management module may enable, via a separate user interface, the user permissions associated with an existing share or export to be deleted or modified.

Other aspects of the invention will become apparent from the detailed description that follows.

BRIEF DESCRIPTION OF DRAWINGS

Some embodiments are illustrated by way of example and not limitation in the figures of the accompanying drawings in which:

FIGS. 3, 4-A through 4-G, and 5 illustrate example user interfaces associated with a unified and simplified workflow for provisioning shared storage, according to an embodiment of the invention.

DETAILED DESCRIPTION

Methods and systems for provisioning storage on a network-attached storage (NAS) unit for use with clients that utilize different application-layer network protocols are described. In the following description, for purposes of explanation, numerous specific details are set forth in order to provide a thorough understanding of example embodiments. It will be evident, however, to one skilled in the art that the present invention may be practiced without these specific details.

Consistent with some embodiments of the invention, a network-attached storage (NAS) management module residing and executing on a host computer system may provide an administrator with the ability to quickly and easily identify (or generate) a folder, on a NAS unit, to be made accessible to client computers via different application-layer network protocols. For instance, in some embodiments, the NAS management module enables an administrator to generate a share—providing access to the folder via the Common Internet File System (CIFS)—and an export—providing access to the folder via the Network File System (NFS) protocol. In the examples provided herein, CIFS and NFS are presented as two examples of protocols at the application-layer (e.g., layer 7) of the Open System Interconnection Reference Model (OSI Model). However, other application-layer network protocols and protocols in other layers of the OSI Model may be supported by certain alternative embodiments of the invention.

In contrast to many conventional NAS management tools, a NAS management module consistent with an embodiment of the invention provides a single workflow for generating both a share and an export. For purposes of the present disclosure, a "workflow" (sometimes referred to as a "wizard") is a user interface element including a combination of dialog boxes and corresponding logic. Through the presentation of the dialog boxes, an administrator is prompted to provide input (e.g., configuration data), and is led through a series of tasks in a specific sequence, where the task sequence may be modified and certain dialog boxes presented (or not presented) in a particular order, based on the received input. After the appropriate configuration data has been requested and received, the underlying workflow logic processes the configuration data to generate one or more commands that are communicated, over the network, to the NAS unit. The commands, which coincide with application programming interface (API) commands supported by an API of the NAS unit, are processed by the NAS unit to generate the necessary data structures that provide client access to the target folder and its contents. Other inventive aspects will be readily apparent from the description of the figures that follows.

Figure 1:
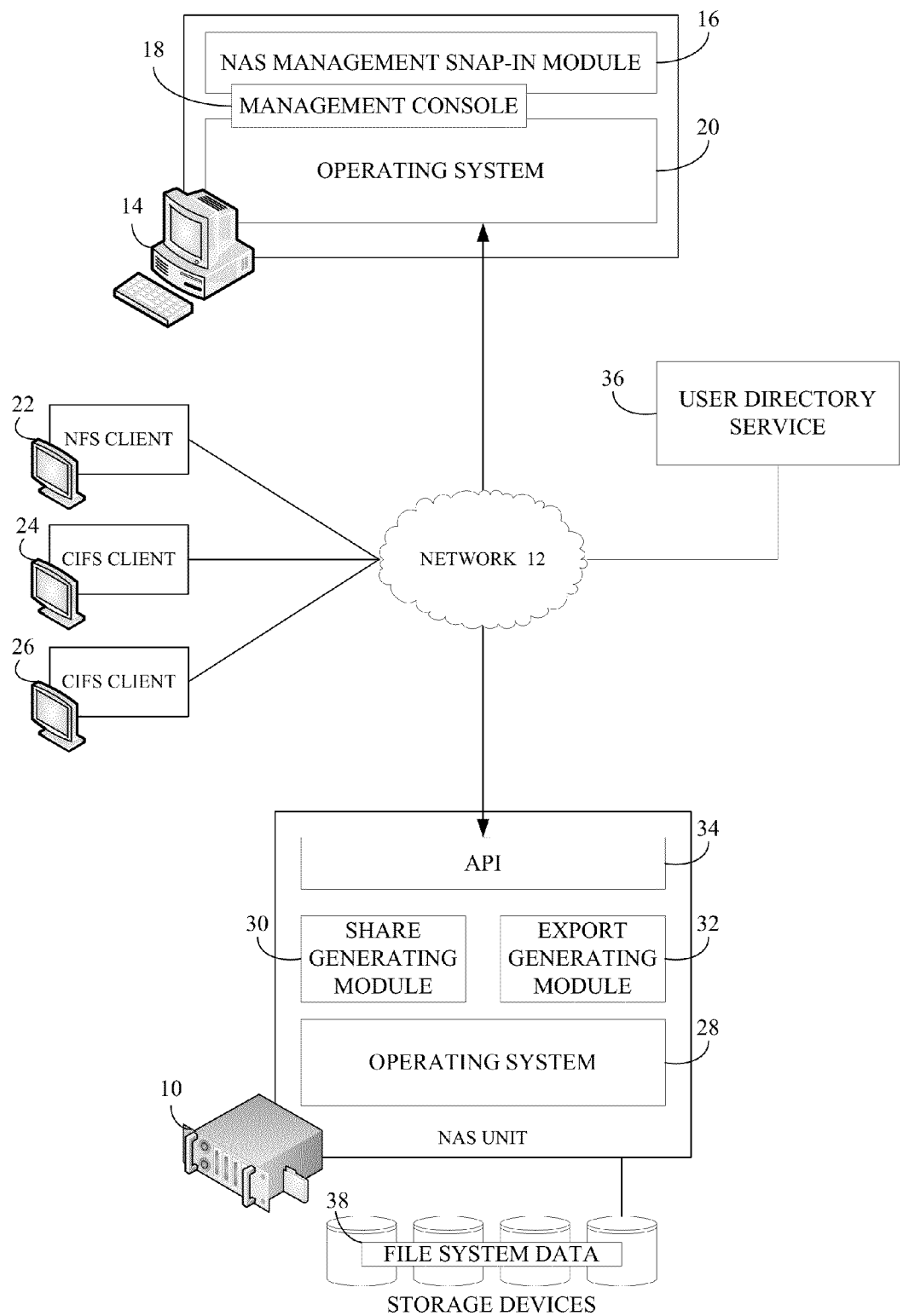
FIG. 1 illustrates a functional block diagram of a NAS unit coupled, via a network, to a computer system with a NAS management application (e.g., NAS management snap-in module) according to an embodiment of the invention.

FIG. 1 illustrates a functional block diagram of a NAS unit 10 coupled, via a network 12, to a computer system 14 with a NAS management application 16 (e.g., NAS management snap-in module) according to an embodiment of the invention. The NAS management application in FIG. 1 is shown to be implemented as a NAS management snap-in module 16, which operates in conjunction with a management console 18. For example, in some embodiments, the operating system 20 is a version of Microsoft® Windows. As such, the operating system includes a component referred to as the Microsoft Management Console (MMC). Accordingly, at least in some embodiments of the invention, the NAS management module 16 may be implemented as a snap-in that interfaces with the management console 18 via an application programming interface (API) of the management console. Of course, in other embodiments, the NAS management module 16 might be a stand-alone application that is independent of the management console 18. Furthermore, in some embodiments, the NAS management application may be compatible with operating systems other than Microsoft Windows.

As described in greater detail below, in some embodiments, the NAS management snap-in module 16 manifests itself to an administrator primarily in the form of a series of dialog boxes referred to herein as a workflow. By interacting with a single workflow, an administrator is able to configure the NAS unit to make a folder on the NAS accessible to client computers supporting different application-layer network protocols (e.g., NFS client 22, and CIFS clients 24 and 26). The NAS management module 16 may have a variety of additional user interfaces that expose and support various other configuration and management tasks as well.

In some embodiments the NAS unit 10 has an operating system 28, including logic to generate a share, and logic to generate an export. For instance, in FIG. 1 the NAS unit 10 is shown to include a share generating module 30 and an export generating module 32. These modules 30 and 32 may be accessible directly from a command line interface of the NAS unit 10, enabling an administrator to generate a share and/or an export by entering the appropriate command at a command line interface of the NAS unit. Alternatively, an API 34 may expose various commands to external devices, including those commands associated with the share generating module 20 and the export generating module 32. Accordingly, in some embodiments, configuration data obtained by the computer system 14 executing the NAS management module 16 can be formatted into commands that are communicated, via the network, to the API of the NAS unit 10, where they are processed by the NAS unit 10. For example, in some embodiments, configuration data received via a workflow presented at computer system 14 are communicated in one or more commands to the NAS interface 34 in order to generate a share and/or an export for a particular shared folder residing in the file system data 38 of the NAS unit 10. In some embodiments of the invention, the NAS unit 10 may be a filer developed by and available from NetApp, Inc. of Sunnyvale, Calif. Accordingly, in some embodiments, the operating system 28 of the NAS unit may be the Data Ontap operating system, and the API 34 may be a version of the Zephyr API, or ZAPI.

In some embodiments of the invention, a workflow is presented as a series of dialog boxes to an administrator. The input received via the dialog boxes is processed by the NAS management module 16 to formulate commands for generating a share and/or export at the NAS unit. In some embodiments, a dialog box may prompt an administrator to provide folder permission information, specifying which users are permitted to access a shared folder and its contents. Accordingly, the underlying logic of the workflow may interface with a user directory service 36 (e.g., Active Directory Domain Services) present on the network 12. For example, when a user is presented with a dialog box for establishing user permissions for a share or export, the dialog box may be pre-populated with a list of users or groups associated with the particular domain in which the share or export resides. This enables an administrator to quickly browse through and select the users and/or groups who are to have permission to access the shared folder via the CIFS and/or NFS protocols. In some embodiments, a dialog box will also present an administrator with various levels of access permissions. For instance, in addition to specifying that a particular user or group is to have access to a particular shared folder, by manipulating the access permissions, an administrator can specify the particular permissions that a user or group is to have. In some embodiments, the permissions may be specified as "Full Control", "Change", and "Read", as is common for the CIFS protocol. In other instance, the access permissions may be specified in a binary form with a designation such as, "rwx", where each letter indicates an authority to read, write and execute, as is common with NFS protocols.

Figure 2:
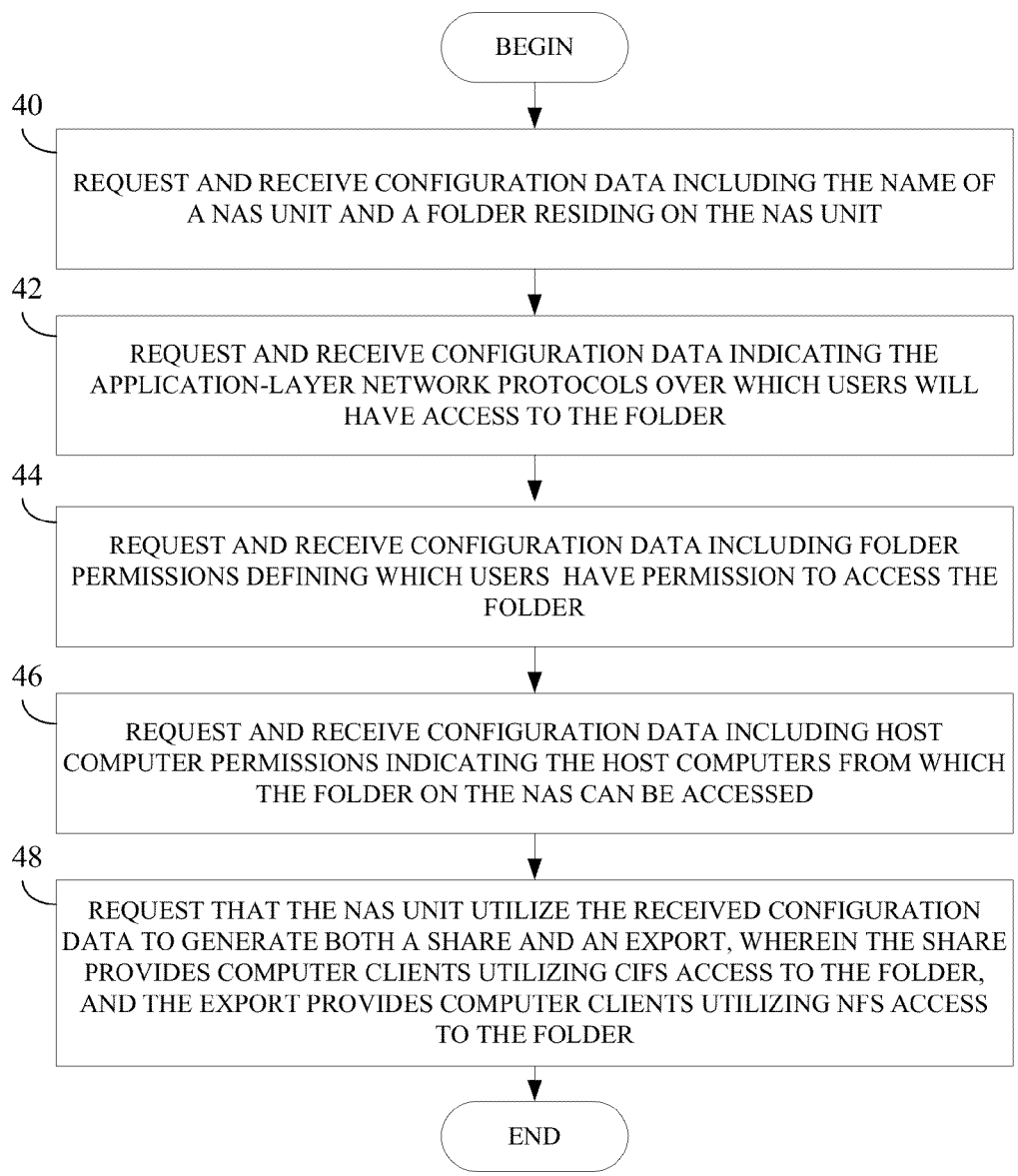
FIG. 2 illustrates the method operations of a method for managing a NAS unit, according to an embodiment of the invention.
Figure 3:
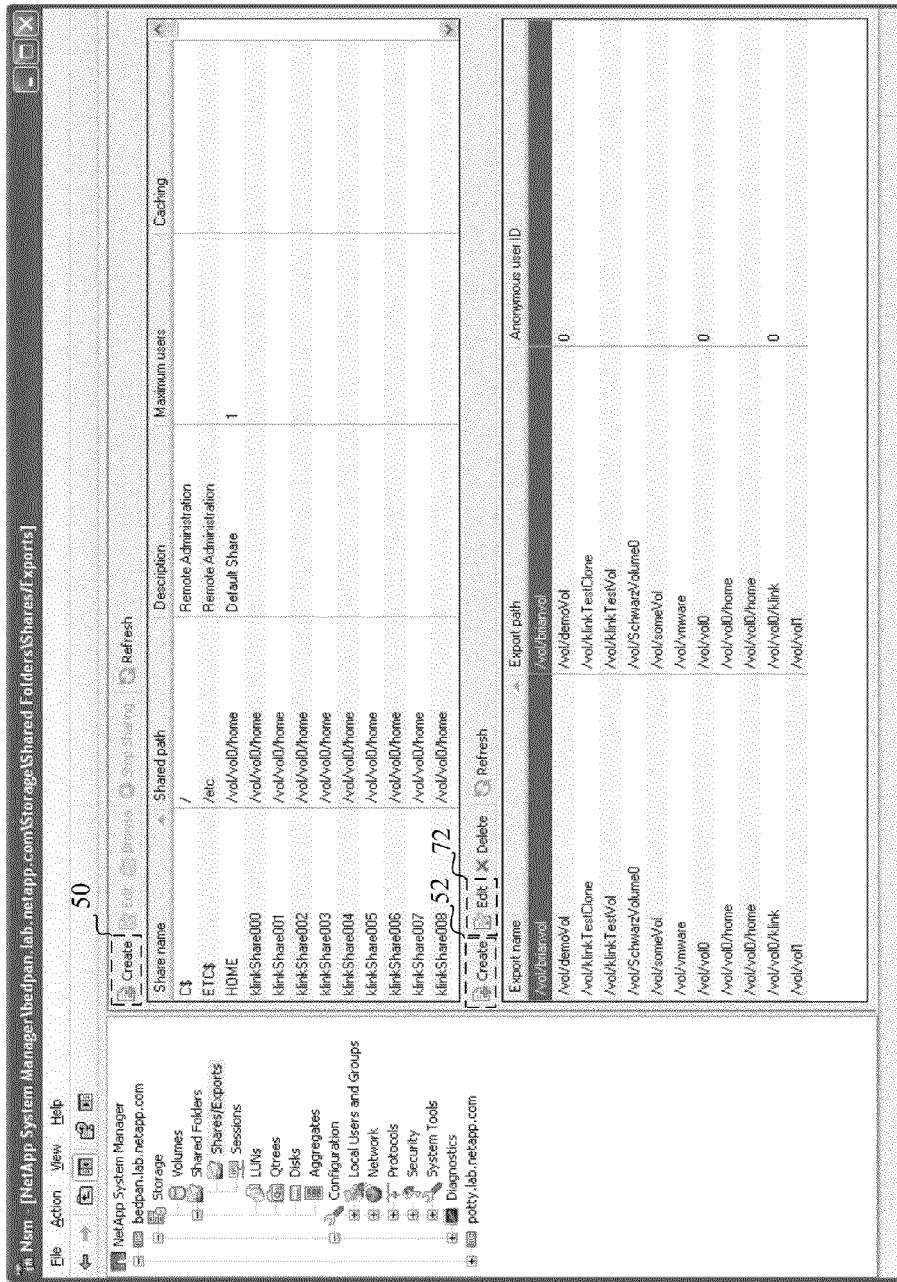

FIG. 2 illustrates the method operations of a method for managing a NAS unit, according to an embodiment of the invention. More precisely, FIG. 2 illustrates a method for making a folder on the NAS unit accessible to various client computers that utilize different application-layer network protocols (e.g., CIFS and NFS). The method illustrated in FIG. 2 is described in the context of the example user interfaces illustrated in FIGS. 3 and 4-A through 4-G. It will be readily recognized by skilled artisans that the order of the method operations presented in FIG. 2 can be rearranged, and that one or more method operations illustrated in FIG. 2 as a distinct operation might be combined with one or more of the other operations, without significantly departing from the scope and spirit of the embodiments of the invention. Moreover, the user interface examples illustrated in FIGS. 3 and 4-A through 4-G are provided to convey an understanding of a particular embodiment of the invention, and alternative embodiments of the invention may utilize user interfaces that vary significantly from what is depicted, without departing from the scope and spirit of the invention.

In some embodiments, the method is initially invoked when an administrator, interacting with a graphical user interface, selects a user interface element (e.g., a button or menu item) indicating a request to generate a share, export, or both. For example, in the example user interface of FIG. 3, the two buttons 50 and 52, both labeled "Create", will invoke the process (e.g., the method) for generating a shared folder on the NAS unit. In some embodiments, selecting either button 50 or 52 (in FIG. 3) will result in displaying a welcome dialog box 54 for the workflow, such as the workflow welcome dialog box 54 illustrated in FIG. 4-A.

As part of the workflow, at method operation 40, the administrator is requested to provide, or in some instances, to select, the name of an available NAS unit and a folder name corresponding to the folder the administrator desires to share, or make available to client computers. This is illustrated in FIG. 4-B by the dialog box 56, which shows two input fields 58 and 60—one each for the NAS unit name (e.g., the "System") and the folder to share. In some embodiments, a separate user interface element—in this instance, the "Browse" button 62—may provide access to a mechanism for viewing and selecting available NAS units and folders. For instance, when an administrator selects the "Browse" button 62, a separate dialog box (e.g., dialog box 64 illustrated in FIG. 4-C) may appear, allowing the administrator to peruse the available NAS units on the network, and their corresponding folder hierarchies.

Once the NAS name and folder name are received (or selected), at method operation 42, the administrator is prompted to provide additional configuration data, including a selection of the particular application-layer protocols over which a user will be allowed to access the shared folder. For instance, in the example dialog box 66 illustrated in FIG. 4-D, the administrator is being prompted to indicate whether the shared folder will be accessible via the CIFS protocol, the NFS protocol, or both. By simply checking the boxes 68 and 70, the administrator can provide the necessary protocol selection. In some embodiments, certain configuration data are automatically generated based on previously supplied information (e.g., the NAS unit name and folder name) and provided as input by default. For instance, in FIG. 4-D, the values for the share name 72, share description 74, and export name 76 are all automatically generated and populate their respective fields as default settings, which can be overridden by the administrator if desired.

Next, at method operation 44, the administrator is prompted to provide additional configuration data, including user access permissions that define which users are to be permitted access to the selected shared folder, and what level of access is permitted. In some embodiments, the dialog box prompting the administrator to provide the user access permissions data may be automatically populated with a list of users, for example, by accessing and reading a network-accessible user directory service. For instance, in some embodiments, the NAS management module performing the method operations may be configured to access a directory service (e.g., Active Directory Domain Service) with a Lightweight Directory Access Protocol (LDAP) or a similar protocol. In other alternative embodiments, the NAS management module may be configured to access other directory services. In any case, the graphical user interface associated with the workflow may facilitate a mechanism by which an administrator can specify permissions by "pointing" and "clicking" with a cursor control device (e.g., a mouse). In some embodiments, a single dialog box will be displayed for both CIFS-based permissions and NFS-based permissions. Alternatively, in some embodiments, two dialog boxes may be displayed in series, allowing the administrator to separately select or identify the appropriate user permissions for each type of protocol. In some embodiments, one or more common permission selections may be displayed, for example, providing the administrator with options to allow all users read-only access, administrators full access and all others read-only access, or administrators full access and all others no access. In other embodiments, the user access permissions may be specified at a more granular level.

Next, at method operation 46, the administrator is prompted to provide configuration data including the particular host computers from which the folder on the NAS unit can be accessed. For example, in some instances, access to the shared folder may be limited such that access is permitted only from certain host computers. A list of host computers may be specified and used to generate host computer permissions that are enforced by the NAS unit, to prevent unauthorized access to the shared folder.

Finally, at method operation 48, after all of the configuration data has been received by the NAS management module, a request is communicated to the NAS unit to utilize the configuration data to generate both a share and an export, thereby enabling access to the shared folder over both the CIFS protocol and the NFS protocol. In some embodiments, the request directed to the NAS unit will be a single communication with multiple commands. Alternatively, the request directed to the NAS unit may be a series of commands. In some embodiments, the command(s) will be communicated to the NAS unit via the hypertext transport protocol (HTTP or HTTPS), while in other embodiments, other protocols may be used. In some embodiments, a dialog box 68 summarizing the configuration data collected and the commands to be communicated to the NAS unit are presented to the administrator, prior to committing the commands to the NAS unit. For instance, as illustrated in dialog box 68 (FIG. 4-F), the pseudo-commands that are to be communicated to the NAS unit are presented to an administrator for review. Additionally, after the commands are communicated to the NAS unit and processed by the NAS unit, the NAS unit will provide a message indicating whether the commands were successfully processed at the NAS unit. This command processing status may be displayed in a final dialog box, such as dialog box 70 (FIG. 4-G).

In some embodiments, the dialog boxes presented as part of the workflow, as well as the particular configuration data that an administrator is prompted to provide, will be dependent upon the particular software components that have been licensed by the entity operating the NAS unit and/or the NAS management application. For instance, the NAS unit may provide support for both CIFS and NFS, but require that a separate license be obtained for each protocol. If a particular business entity has a license for only one protocol (e.g., the CIFS protocol), the dialog boxes presented as part of the workflow will only prompt an administrator for the configuration data corresponding to the licensed protocol. In some embodiments, a dialog box may present an unavailable option as grayed out, or with some other characteristic indicating its unavailability. Alternatively, in some embodiments, a separate dialog box may be presented showing only the available options from which an administrator is to select or enter configuration data. This simplifies the process from the perspective of the administrator as it eliminates any confusion that might be caused by presenting the administrator with options that are unavailable.

In addition to presenting a single workflow for configuring a shared folder for access by client computers utilizing different network protocols, in some embodiments the NAS management module facilitates browsing NAS-based entities (e.g., folders, shares and exports), as well as editing, deleting and/or modifying the configuration settings of these NAS-based entities. For example, in the example user interface of FIG. 3, the button labeled "Edit" with reference number 72 provides access to a separate user interface component used to edit the configuration settings or parameters of an existing export. Accordingly, by selecting an existing export (or share) in the list of exports (or list of shares) being presented, and then selecting the appropriate button (e.g., "Edit" button 72), an administrator will be presented with a user interface, such as that depicted in FIG. 5, allowing the administrator to edit the user access permissions.

Figure 5:
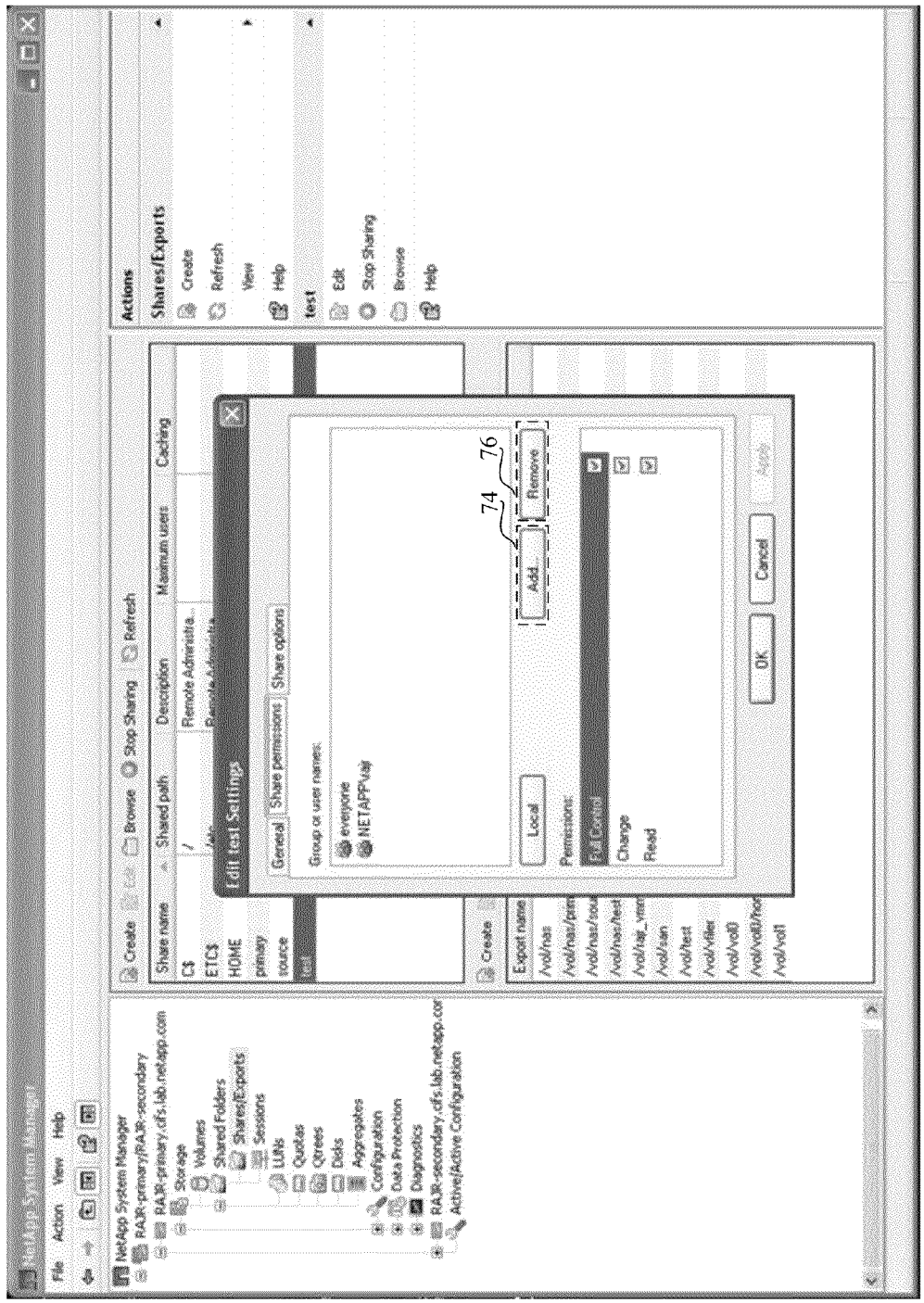

In FIG. 5, a list of groups and users is shown, as is a list of permissions. Selecting a particular group or user will display the particular permissions that group or user has. A button labeled "Add" with reference number 74 enables an administrator to add new groups or users who are to be provided with access to the shared folder (export or share). Similarly, the button labeled "Remove" with reference number 76 enables an administrator to remove a group or user, thereby removing that group's or user's permission to access the shared folder.

In some embodiments, the NAS management module is configured to access one or more network-based user directory services, enabling an administrator to quickly and easily browse for the appropriate group or user to be added to the list of groups and/or users with permission to access the shared folder. In addition, in some embodiments, the user access permissions may be presented and specified as CIFS-based permissions, such as "Full Control", "Change" and "Read". Alternatively, in some embodiments, NFS-based permissions can be specified in the conventional binary format, "rwx", where the individual letters represent read, write and execute privileges. In some embodiments, the access permissions are separately established and managed, such that NFS-based permissions are enforced by the NAS unit only for file requests received via the NFS protocol. Similarly, CIFS-based permissions are used for CIFS-based file requests. Alternatively, in some embodiments, the NAS unit will map NFS-based permissions to their equivalent set of CIFS-based permissions—such operating mode generally being referred to as a multiprotocol mode. In the multiprotocol mode, a user will have the same access permissions to a file regardless of which protocol is being used to access the folder and its contents. In multiprotocol mode, the NAS unit maps the authentication information (e.g., username/password) for CIFS and NFS to a common user account. This way irrespective of where the requests come from (CIFS or NFS) the requests will get authenticated to the common account credentials. In addition, this also establishes a common way to login with the same user name/account from both CIFS and NFS clients.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. Accordingly, the modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or as a service, for example, such as in the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 6:
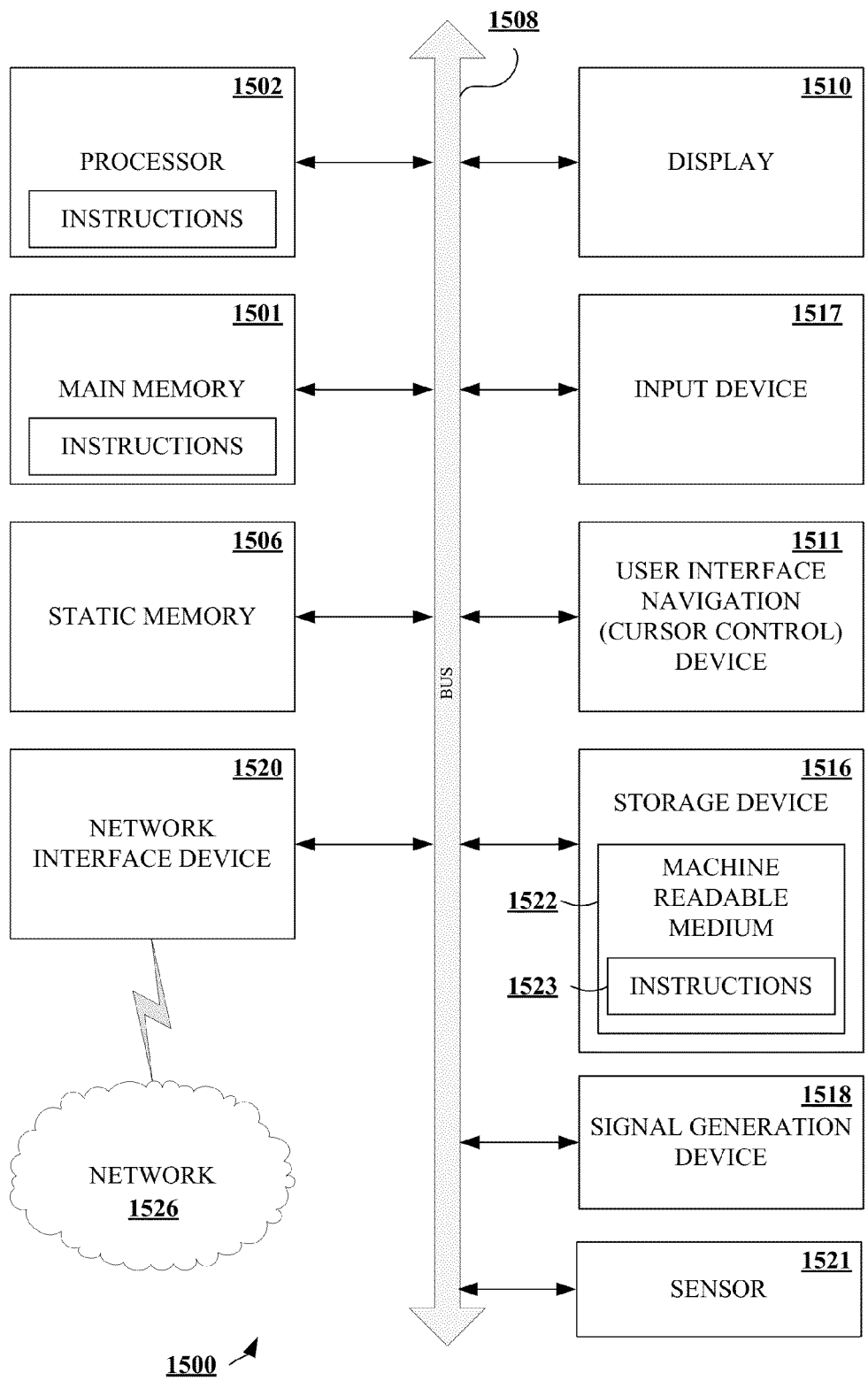
FIG. 6 is a block diagram of a machine in the example form of a computer system within which a set of instructions, for causing the machine to perform any one or more of the methodologies discussed herein, may be executed.

FIG. 6 is a block diagram of a machine in the form of a computer system within which a set of instructions, for causing the machine to perform any one or more of the methodologies discussed herein, may be executed. In some embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a server, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the included claims, along with the full range of equivalents to which such claims are entitled.

What is claimed is:

1. A method for managing a network-attached storage (NAS) unit comprising:
    receiving, at a computing device as part of a single workflow, input for configuring the NAS unit that is communicatively coupled to the computing device via a network, wherein the single workflow to configure the NAS unit is executed by a management application at the computing device;
    determining configuration data from the input, the configuration data identifying (i) a folder stored on the NAS unit, (ii) multiple client computers that are allowed to have access to the folder or its contents, (iii) users that are allowed to have access to the folder or its contents, (iv) a selection of two or more application layer network protocols from multiple possible different application layer network protocols that are to be used when two or more of the multiple client computers access the folder or its contents, and (v) two or more sets of permissions for accessing the folder or its contents, each set of permissions being specific to an application layer network protocol so that the NAS unit enforces that set of permissions when a file request is received from one of the multiple client computers using that application layer network protocol; and
    communicating, from the computing device, one or more commands that are based on the configuration data to the NAS unit to cause the NAS unit to make the folder or its contents available to each of the multiple client computers in accordance with the configuration data, wherein the one or more commands are communicated to the NAS unit to utilize the configuration data to generate a first share, the first share providing client access to the folder and its contents via a first protocol of the two or more application layer network protocols, and a second share, the second share providing client access to the same folder and its contents via a second protocol of the two or more application layer network protocols; wherein the first share and the second share are generated as part of the single workflow for configuring the NAS unit;
    and wherein the NAS unit maps the two or more sets of permissions corresponding to the two or more application layer network protocols for accessing the folder or its contents using either of the two or more application layer protocols in a multiprotocol mode by a common user account using common account credentials for both the two or more application layer protocols.

2. The method of claim 1, wherein the first share is a share using the Common Internet File System (CIFS) protocol and the second share is an export using the Network File System (NFS) protocol.

3. The method of claim 1, wherein determining configuration data includes determining configuration data that identifies a level of access permitted to the folder or its contents for each user operating one of the multiple client computers.

4. The method of claim 1, wherein receiving input includes accessing a network-based user directory service to identify users or clients that may be granted permission to access the folder.

5. The method of claim 4, wherein receiving input includes providing, on a display of the computing device, at least one user interface as part of a single workflow, the at least one user interface displaying a list of the users or clients that may be granted permission to access the folder and that are associated with a particular domain in which the folder resides in.

6. The method of claim 1, wherein the one or more commands cause the NAS unit to prevent any computer which is not identified in the configuration data as one of the multiple client computers that are allowed to have access to the folder or its contents from accessing the folder or its contents.

7. The method of claim 1, wherein receiving the input includes providing, on a display of the computing device, a plurality of user interfaces as part of the single workflow, wherein at least one of the plurality of user interfaces is provided in response to receiving input on a previously displayed user interface of the plurality of user interfaces.

8. The method of claim 1, wherein communicating the one or more commands is performed through an application programming interface of the NAS unit that supports the one or more commands.

9. The method of claim 1, wherein receiving input includes:
responsive to receiving a request to browse a folder hierarchy, communicating a request to the NAS unit for folder hierarchy data; and
displaying, on a display of the computing device, a user interface of the folder hierarchy based on the folder hierarchy data so as to enable selection of an existing folder at the NAS unit to be identifiable.

10. The non-transitory, storage medium of claim 1, wherein receiving input includes accessing a network-based user directory service to identify users or clients that may be granted permission to access the folder.

11. A processing system, comprising:
at least one processor; and
a machine-readable medium in communication with the at least one processor, the machine-readable medium storing instructions that, when executed by the at least one processor, causes the processing system to perform operations comprising:
receiving input for configuring a network-attached storage (NAS) unit that is communicatively coupled to the processing system via a network as part of a single workflow; wherein the single workflow to configure the NAS unit is executed by a management application by the processing system;
determining configuration data from the input, the configuration data identifying (i) a folder stored on the NAS unit, (ii) multiple client computers that are allowed to have access to the folder or its contents, (iii) users that are allowed to have access to the folder or its contents, (iv) a selection of two or more application layer network protocols from multiple possible different application layer network protocols that are to be used when two or more of the multiple client computers access the folder or its contents, and (v) two or more sets of permissions for accessing the folder or its contents, each set of permissions being specific to an application layer network protocol so that the NAS unit enforces that set of permissions when a file request is received from one of the multiple client computers using that application layer network protocol; and
communicating, from the computing device, one or more commands that are based on the configuration data to the NAS unit to cause the NAS unit to make the folder or its contents available to each of the multiple client computers in accordance with the configuration data, wherein the one or more commands are communicated to the NAS unit to utilize the configuration data to generate a first share, the first share providing client access to the folder and its contents via a first protocol of the two or more application layer network protocols, and a second share, the second share providing client access to the same folder and its contents via a second protocol of the two or more application layer network protocols; wherein the first share and the second share are generated as part of the single workflow for configuring the NAS unit; and wherein the NAS unit maps the two or more sets of permissions corresponding to the two or more application layer network protocols for accessing the folder or its contents using either of the two or more application layer protocols in a multiprotocol mode by a common user account using common account credentials for both the two or more application layer protocols.

12. The processing system of claim 11, wherein the instructions cause the processing system to determine configuration data by determining configuration data that identifies a level of access permitted to the folder or its contents for each user operating one of the multiple client computers.

13. The processing system of claim 11, wherein the instructions cause the processing system to access a network-based user directory service to identify network users who may be granted permission to access the folder via a share or an export.

14. The processing system of claim 13, wherein the instructions cause the processing system to receive input by providing, on a display of the processing system, at least one user interface as part of the single workflow, the at least one user interface displaying a list of the users or clients that may be granted permission to access the folder and that are associated with a particular domain in which the folder resides in.

15. The processing system of claim 11, wherein the instructions cause the processing system to receive input by providing, on a display of the processing system, a plurality of user interfaces as part of a single workflow, wherein at least one of the plurality of user interfaces is provided in response to receiving input on a previously displayed user interface of the plurality of user interfaces.

16. The processing system of claim 11, wherein the first share is a share using the Common Internet File System (CIFS) protocol and the second share is an export using the Network File System (NFS) protocol.

17. The processing system of claim 11, wherein the instructions cause the processing system to receive input by:
responsive to receiving a request to browse a folder hierarchy, communicating a command to the NAS unit for folder hierarchy data; and
displaying, on a display of the processing system, a user interface of the folder hierarchy data in using the one or more interfaces, so as to enable selection of an existing folder at the NAS unit to be identified in the configuration data as the folder for which a share and an export are to be generated.

18. The processing system of claim 11, wherein the one or more commands cause the NAS unit to prevent any computer which is not identified in the configuration data as one of the multiple client computers that are allowed to have access to the folder or its contents from accessing the folder or its content.

19. A non-transitory, machine readable storage medium having stored thereon instructions for performing a method, comprising machine executable code which when executed by at least one machine, causes the machine to:
receive, at a computing device as part of a single workflow, input to configure a networked attached storage (NAS) unit that is communicatively coupled to the computing device via a network, wherein the single workflow to configure the NAS unit is executed by a management application at the computing device;
determine configuration data from the input, the configuration data identifes (i) a folder stored on the NAS unit, (ii) multiple client computers that are allowed to have access to the folder or its contents, (iii) users that are allowed to have access to the folder or its contents, (iv) a selection of two or more application layer network protocols from multiple possible different application layer network protocols that are to be used when two or more of the multiple client computers access the folder or its contents, and (v) two or more sets of permissions for accessing the folder or its contents, each set of permissions being specific to an application layer network protocol so that the NAS unit enforces that set of permissions when a file request is received from one of the multiple client computers using that application layer network protocol; and
communicate, from the computing device, one or more commands that are based on the configuration data to the NAS unit to cause the NAS unit to make the folder or its contents available to each of the multiple client computers in accordance with the configuration data, wherein the one or more commands are communicated to the NAS unit to utilize the configuration data to generate a first share, the first share providing client access to the folder and its contents via a first protocol of the two or more application layer network protocols, and a second share, the second share providing client access to the same folder and its contents via a second protocol of the two or more application layer network protocols; wherein the first share and the second share are generated as part of the single workflow for configuring the NAS unit; and wherein the NAS unit maps the two or more sets of permissions corresponding to the two or more application layer network protocols for accessing the folder or its contents using either of the two or more application layer protocols in a multiprotocol mode by a common user account using common account credentials for both the two or more application layer protocols.

20. The non-transitory, storage medium of claim 19, wherein the first share is a share using the Common Internet File System (CIFS) protocol and the second share is an export using the Network File System (NFS) protocol.

* * * * *